United States Patent
Doerr et al.

(10) Patent No.: US 11,821,776 B2
(45) Date of Patent: Nov. 21, 2023

(54) MASS FLOW SENSOR ASSEMBLY AND METHOD OF MANUFACTURING A MASS FLOW SENSOR ASSEMBLY

(71) Applicants: Buerkert Werke GmbH & Co. KG, Ingelfingen (DE); Burkert S.A.S., Triembach-au-Val (FR)

(72) Inventors: Andreas Doerr, Ingelfingen (DE); Tanja Hertweck, Ingelfingen (DE); Jan Magnussen, Ingelfingen (DE); Juergen Wiedemann, Ingelfingen (DE); Armin Arnold, Ingelfingen (DE); Frederic Heinrich, Ingelfingen (DE)

(73) Assignees: BUERKERT WERKE GMBH & CO. KG; BURKERT S.A.S.

( * ) Notice: Subject to any disclaimer, the term of this patent is extended or adjusted under 35 U.S.C. 154(b) by 204 days.

(21) Appl. No.: 16/881,092

(22) Filed: May 22, 2020

(65) Prior Publication Data

US 2020/0370939 A1    Nov. 26, 2020

(30) Foreign Application Priority Data

May 22, 2019 (FR) .................................. 19/05379

(51) Int. Cl.
*G01F 1/84* (2006.01)
(52) U.S. Cl.
CPC .......... *G01F 1/8431* (2013.01); *G01F 1/8413* (2013.01); *G01F 1/8427* (2013.01)
(58) Field of Classification Search
CPC ..... G01F 1/8431; G01F 1/8413; G01F 1/8427

USPC ..................................................... 73/861.356
See application file for complete search history.

(56) References Cited

U.S. PATENT DOCUMENTS

| 5,191,793 A * | 3/1993 | Drexel ................ G01F 1/6847 73/204.25 |
| 5,347,861 A * | 9/1994 | Satoh .................. G01F 1/6847 73/204.22 |
| 6,318,171 B1 | 11/2001 | Suzuki |
| 6,779,394 B2 | 8/2004 | Ambrosina et al. |
| 2003/0115949 A1* | 6/2003 | Ambrosina ........... G01F 1/6847 73/202.5 |
| 2008/0196494 A1* | 8/2008 | Suzuki ................ G01F 1/6847 73/204.25 |
| 2010/0089459 A1* | 4/2010 | Smirnov ............... G01F 5/00 73/204.15 |

(Continued)

FOREIGN PATENT DOCUMENTS

| DE | 10297602 B4 | 9/2008 |
| EP | 809090 A1 * | 11/1997 ........... G01F 1/6847 |
| EP | 0809090 A1 | 11/1997 |

(Continued)

*Primary Examiner* — John Fitzgerald
*Assistant Examiner* — Rodney T Frank
(74) *Attorney, Agent, or Firm* — Dilworth IP, LLC

(57) ABSTRACT

A mass flow sensor assembly for a mass flow controller or a mass flow meter comprises a mass flow sensor comprising a capillary tube held by a first corner support and a second corner support formed separately from each other. The capillary tube comprises a sensor portion which is located between the two corner supports, and wherein the two corner supports each have an arc-shaped groove in which the capillary tube is partially received. In addition, a method of manufacturing a mass flow sensor assembly is described.

14 Claims, 4 Drawing Sheets

(56) References Cited

U.S. PATENT DOCUMENTS

2016/0178420 A1\* 6/2016 Sasaki .................... B23K 11/18
73/204.27

FOREIGN PATENT DOCUMENTS

| EP | 1867962 A1 | 12/2007 |
| EP | 2338036 B1 | 3/2017 |
| JP | S57110920 A | 7/1982 |
| WO | 2011035048 A1 | 3/2011 |
| WO | 2015093941 A1 | 6/2015 |

\* cited by examiner

MASS FLOW SENSOR ASSEMBLY AND METHOD OF MANUFACTURING A MASS FLOW SENSOR ASSEMBLY

FIELD OF THE DISCLOSURE

The present disclosure relates to a mass flow sensor assembly for a mass flow controller (MFC) or a mass flow meter (MFM). The present disclosure further relates to a method of manufacturing a mass flow sensor assembly.

BACKGROUND

Mass flow controllers or mass flow meters are known from the prior art which have a mass flow sensor configured as a capillary sensor. The mass flow sensor is usually assigned to a bypass line of the mass flow controller or the mass flow meter. In addition to the bypass line, the mass flow controller or mass flow meter usually comprises a main line which is configured, for example, as a main channel through which the major part of the medium to be measured flows. A (laminar) flow element is arranged in the main line, which generates a (small) pressure drop. The laminar flow element is also referred to as laminar flow element (LFE). Due to the pressure drop, a part of the total flow proportional to the pressure drop is driven through the capillary tube of the mass flow sensor, which measures the corresponding mass flow, from which the total mass flow can then be deduced, provided that the properties of the flow element are known. The main line can also be closed as far as possible such that almost the entire mass flow flows through the bypass line. The terms "bypass line" and "main line" may also be used the other way round, depending on how they are understood The concrete measurement of the mass flow is typically carried out via sensor coils, which are formed by wound heating resistors or heating wires connected to an evaluation electronics. When the medium to be measured flows through the capillary tube, heat is transported in the direction of flow due to the flow, which is correspondingly detected by the sensor coils and can then be evaluated by the evaluation electronics.

However, the mass flow sensor assemblies known from the prior art are relatively complex to manufacture, as the handling of the filigree capillary tube is costly. The complex production leads to high manufacturing costs.

There is a need to provide a simply constructed mass flow sensor assembly that can be manufactured at low cost.

SUMMARY

This is achieved by a mass flow sensor assembly for a mass flow controller or a mass flow meter, which comprises a mass flow sensor. The mass flow sensor has a capillary tube which is held by a first corner support and a second corner support which are formed separately from each other. The capillary tube comprises a sensor portion that is located between the two corner supports. The two corner supports each have an arc-shaped groove in which the capillary tube is partially received.

The basic idea is to mechanically fix the capillary tube in a simple manner by supporting the capillary tube by two separately formed corner supports. In addition, the capillary tube can be prefabricated in the desired shape, as it only has to be inserted into the two corner supports, in particular the respective arc-shaped groove, in order to be held securely. The capillary tube is also manufactured in an integral manner or in one-piece. This simplifies the handling and the mechanical fastening of the capillary tube, which is particularly important for the subsequent arrangement of the sensor coils.

Furthermore, the capillary tube, in particular the sensor portion thereof, is exposed between the two corner supports. This makes it easier to surround the sensor portion with a thermal insulation, such that it has a better thermal protection. As a result, the measuring accuracy is improved as external thermal influences can be effectively shielded.

In this respect, the two corner supports do not abut each other. The corner supports therefore do not contact each other. Rather, the two corner supports are spaced apart from each other.

As the two corner supports are spaced apart, a distance or free space is provided between the two corner supports. The free space is in particular assigned to the sensor portion.

The two corner supports are therefore exclusively assigned to different portions of the capillary tube, in particular to opposite portions with respect to the sensor portion of the capillary tube. The opposite portions with respect to the sensor portion are those portions which adjoin the respective ends of the sensor portion.

In particular, the two corner supports are arranged in a common plane, in particular a common sectional plane of the mass flow sensor assembly. The capillary tube also runs in this plane.

Consequently, the corner supports are not two halves of a housing which are assembled to form a receptacle for the capillary tube.

In the mass flow sensor assembly, the two corner support which are formed separately from each other.

The mass flow sensor of the mass flow sensor assembly is therefore based on the measuring principle of a capillary sensor due to the capillary tube.

One aspect provides that the capillary tube has at least two arcuate portions which are arranged in the arc-shaped grooves of the two corner supports, the sensor portion being provided between the two arcuate portions. The two arcuate portions may each be joined by straight legs, in particular at the respective ends of the arcuate portions opposite the sensor portion. The arcuate portions can each correspond to a (substantially) 90° curve, so that the entire capillary tube (substantially) has a U-shape.

The U-shaped capillary tube may have been manufactured accordingly or may have been shaped accordingly in advance, for example may have been plastically deformed.

In particular, a corner support is assigned (exclusively) to one of the two arcuate portions of the capillary tube. For this reason, the corner supports are also referred to as corner supports, as they each support an arcuate portion of the capillary tube that corresponds to a corner.

The corner supports can therefore be configured so as to each support only one arcuate portion, the leg branching off from the arcuate portion and the sensor portion branching off from the arcuate portion being not supported by the corresponding corner support. In other words, both the leg and the sensor portion are exposed with respect to the corresponding corner support.

Generally, only the two arcuate portions of the capillary tube can thus be supported by the corner supports, whereas the two legs and the sensor portion are free in relation to the corner supports. In particular, an arcuate portion of the capillary tube is supported exclusively by one corner support.

Basically, the capillary tube, which is in particular configured in one piece, can be made of a metal, for example stainless steel. In this way, even aggressive media can be conducted through the capillary tube. In particular, no elastomers are provided, for example seals or similar, which could come into contact with the medium and could be attacked.

To secure the capillary tube at the corner supports, the arcuate portions can be additionally fastened by an inter-material bond and/or with a frictional fit, for example by an adhesive connection, after insertion into the respective arc-shaped groove (interlocking fit). This ensures a permanent fixing of the capillary tube to the corner supports and thus a reliable functioning of the mass flow sensor.

A further aspect provides that the mass flow sensor has a first sensor coil and a second sensor coil which are electrically insulated from each other and are wound at least partially around the sensor portion, the first sensor coil being assigned to the first corner support and the second sensor coil being assigned to the second corner support. In particular, the sensor coils are wound identically, so that a high measuring accuracy of the mass flow sensor is obtained, as there are no differences in the sensor coils caused by manufacturing which would have an influence on the measuring result. The sensor coils can be wound mirror-inverted to each other, so that they extend in an identical manner from the assigned corner support in the direction of the respective other sensor coil.

The two sensor coils can be electrically insulated from each other by covering both wires with an electrically insulating layer. A gap is created between the two sensor coils in the area of the sensor portion of the capillary tube. In other words, this means that the windings of the two sensor coils do not overlap.

In principle, the sensor coils can be formed by wires that are wound around the capillary tube and thus comprise several windings. The wires are heating wires or wires serving as heating resistors.

The sensor coils may also be fastened to the capillary tube and/or the respective corner support by an inter-material bond and/or with a frictional fit and can in particular be bonded to the capillary tube or corner support. This ensures that the corresponding sensor coil cannot slip. An interlocking is already produced via the winding, in addition to which an inter-material bond or a frictional fit can also be provided.

In particular, the respective sensor coil, i.e. both the first sensor coil and the second sensor coil, has a first end and a second end, which are connected to a first contact element and a second contact element, respectively, of the assigned corner support. In other words, the first end of the corresponding sensor coil is connected (electrically and/or mechanically) to the first contact element of the respective corner support. The second end of the corresponding sensor coil is connected (electrically and/or mechanically) to the second contact element of the respective corner support. The two sensor coils thus each have two ends which are connected to assigned contact elements of the corresponding corner support. The two ends are therefore the free ends of the corresponding wire which has been wound around the capillary tube to form the respective sensor coil. The connections of the ends to the respective contact elements can be realized by soldered, bonding and/or adhesive connections.

In principle, the corner supports are thus used not only for mechanical fastening of the capillary tube but also for electrical contacting of the respective sensor coil. This also enables a more precise design of the sensor coil, namely a more precise winding of the windings. The corresponding ends can be mechanically fixed to the corner supports so that the sensor coils are effectively prevented from slipping.

A further aspect provides that the respective sensor coil has at least one winding wound around a fastening projection of the assigned corner support. The projection may be part of the first contact element, so that the electrical contacting is permitted via this projection. It may also be provided that the respective sensor coil with the at least one winding is wound around the fastening projection in order to fix the sensor coil in position. In any case, this simplifies the electrical contacting and mechanical fastening of the respective sensor coil.

In particular, the fastening projection is substantially perpendicular to the sensor portion. This improves the mechanical fastening of the sensor coil with respect to the capillary tube.

Basically, the fastening projection may also be referred to as a corner support nose, as the fastening projection protrudes from the base body of the corner support like a nose, i.e. protrudes outwards.

A further aspect provides that the mass flow sensor assembly has a sensor housing in which the mass flow sensor is at least partially received, in particular wherein the sensor housing is configured in several parts. The sensor housing protects the mass flow sensor from external influences.

In particular, the sensor housing also provides thermal insulation, thus increasing the measuring accuracy of the mass flow sensor. In other words, the mass flow sensor, especially the capillary tube, has a better thermal shielding.

For example, the sensor housing comprises a base part and a cover, which together define a receiving space for the mass flow sensor. The mass flow sensor can be inserted into the base part, wherein the cover largely closes the mass flow sensor to the outside and thus protects the latter. An additional casting compound may be brought into the receiving space.

In this respect, the sensor housing can be designed in two parts or consist of two separate parts.

One aspect provides that the sensor housing comprises two recesses in which the two corner supports are received and a cavity which is located between the two recesses, wherein the sensor portion of the capillary tube extends through the cavity, in particular wherein at least one insulation is arranged in the cavity. The improved thermal insulation of the mass flow sensor is ensured via the cavity to which the sensor portion of the capillary tube is assigned. The additional thermal insulation further shields the capillary tube, in particular the sensor portion, against external or environmental influences.

Furthermore, the mass flow sensor assembly can have a circuit board which is in electrical contact with the mass flow sensor via at least one electrical contact. In particular, the circuit board has a plurality of electrical contacts, each of which is in electrical contact with the contact elements formed on the corner supports.

In this respect, the corner supports have the further function of enabling electrical contact with the circuit board directly via the corner supports, i.e. without additional elements.

Basically, the corner supports thus have three different functions, namely the mechanical fastening of the capillary tube, the electrical contacting of the sensor coils and the direct electrical contacting with the circuit board. In other words, the corner supports each have several electrical and mechanical interfaces to be able to provide the above-mentioned functions.

Basically, the present disclosure also relates to a mass flow controller (MFC) or a mass flow meter (MFM) including a mass flow sensor assembly of the aforementioned type. In addition to the mass flow sensor, the mass flow controller or mass flow meter has a fluid block and optionally a valve. In addition, the mass flow controller or mass flow meter may also have a housing, unless this is already formed by the sensor housing. The circuit board, which includes the evaluation electronics, can also provide the electronics for the mass flow controller or mass flow meter if no separate electronics is provided.

The fluid block may include at least one main line which has a flow element or flow resistance arranged therein and interfaces for the mass flow sensor assembly and which forms the bypass line. In particular, the capillary tube forms the bypass line of the mass flow controller (MFC) or mass flow meter (MFM).

Furthermore, a method of manufacturing a mass flow sensor assembly is provided, comprising the following steps:
  providing a first corner support and a second corner support each having an arc-shaped groove and being spaced apart from each other, and
  inserting a capillary tube into the corner supports by fitting arcuate portions of the capillary tube into the arc-shaped grooves such that a sensor portion of the capillary tube is formed between the two spaced apart corner supports.

This creates a mass flow sensor assembly that ensures that the sensor portion of the capillary tube can be shielded particularly well, as it is located between the two corner supports that are spaced apart from each other. In other words, the sensor portion between the two corner supports is (initially) exposed, allowing a thermal insulation to be positioned in close proximity to the sensor portion. This leads to an increased measuring accuracy of the mass flow sensor assembly.

As the two corner supports are spaced apart from each other, a distance or free space is provided between the two corner supports. The free space is in particular assigned to the sensor portion.

In addition, a simplified manufacture of the mass flow sensor assembly is achieved, as the capillary tube can be prefabricated in the desired manner and can then be easily coupled to the two corner supports by inserting the preformed capillary tube into the arc-shaped grooves of the corner supports.

The capillary tube may also have been formed in one piece so that it does not consist of several separately formed parts which are joined together by seals or the like to form the capillary tube. This also enables the mass flow sensor assembly to be used in connection with the process-technical processing of aggressive media.

One aspect provides that, among other things, the two corner supports are manufactured in a common panel. The panel is a circuit board cluster, as it is usually called in electrical joining technology, which consists of individual circuit boards that have not yet been separated. In this respect, a panel includes a plurality of corner supports which are arranged next to each other or one below the other. The corner supports can be produced by milling or etching.

In the panel, the corner supports are in particular arranged substantially in pairs as mirror images of each other, i.e. mirrored around an axis of symmetry. The pairs of corner supports can each represent the two corner supports of a mass flow sensor assembly, in particular a mass flow sensor.

Furthermore, the panel may have several separating edges by means of which the respective corner supports can be separated in a simple manner, for example by separating the corner supports from the rest by manual breaking at the separating edges. Alternatively or additionally, the corner supports can be milled or punched out. Apart from the mentioned separating edges, the corner supports usually do not have any connection to the panel.

Basically, due to the panel which includes at least the two corner supports of the mass flow sensor, the degree of automation in the manufacture of the mass flow sensor assembly may be increased, thus reducing the overall manufacturing costs.

A further aspect provides that a first sensor coil and a second sensor coil are wound around the sensor portion, which are assigned to the first corner support and the second corner support, respectively. The sensor coils can be made from a wire that is wound around the capillary tube in the area of the sensor portion so that the wire forms a corresponding sensor coil. The two sensor coils can be wound in a substantial identical manner, resulting in a correspondingly high measuring accuracy of the manufactured mass flow sensor assembly.

First, a first end of the wire can be fixed (temporarily) to the assigned corner element, and then the rest of the wire is wound around the capillary tube to form the corresponding sensor coil. Then, the other end of the wire, i.e. the second wire end, is again fixed (temporarily) to the corner support, in particular in a permanent manner. Alternatively, the second end of the wire can be directly fixed in a permanent manner. The first wire end can be fixed permanently afterwards unless this has been done at the beginning.

The temporary fixing of the ends can be realized via an adhesive tape, which will be removed again later, after the ends have been permanently fixed and/or electrically contacted. Alternatively, the temporary fixing may also be omitted, so that the ends are directly fixed in a permanent manner.

The two ends of the respective sensor coil can be electrically and/or mechanically connected to the first contact element of the corresponding corner support and to the second contact element of the corresponding corner support, for example by means of a soldered joint. Due to the soldered joint, the (previously provided) electrically insulating layer of both sensor coils is removed. It is thus ensure that the sensor coil is electrically contacted and simultaneously maintains the desired position.

The ends of the sensor coils are therefore brought into electrical contact with contact elements of the assigned corner support.

It may be provided that at least one winding of each sensor coil is wound around a fastening projection of the assigned corner support in order to mechanically fix the corresponding sensor coil to the corner support.

The aforementioned steps are performed for both sensor coils. This can be done synchronously or one after the other.

Furthermore, it can be provided that the corresponding sensor coil is additionally attached to the capillary tube by an inter-material bond and/or with a frictional fit in order to prevent a subsequent displacement of the individual windings. An adhesive connection is for example provided.

The mass flow sensor is thus produced and can be installed.

For this purpose, a sensor housing is provided, which is, for example, configured in several parts. For example, the sensor housing comprises a base part and a cover.

First of all, sleeves may be pressed into the sensor housing, in particular the base part, and/or an insulation is fitted into a cavity of the sensor housing. It can also be provided that the sleeves are glued into the sensor housing and/or welded to the sensor housing.

The mass flow sensor is then inserted by introducing the legs of the U-shaped capillary tube into the respective sleeves such that the mass flow sensor is positioned and aligned with respect to the sensor housing. The sensor portion of the capillary tube is then arranged in the area of the cavity of the sensor housing, which initially has been partially closed to the outside by the insulation on one side. The legs of the U-shaped capillary tube can protrude significantly and at an undefined distance after insertion into the respective sleeves.

A second insulation can then be inserted into the cavity such that the sensor portion of the capillary tube is thermally surrounded or encapsulated by insulations.

The sensor housing can then be closed. To this end, a cover may be placed on a base part of the sensor housing such that the mass flow sensor is protected against external environmental influences. The cover and the base part together have a receiving space in which the mass flow sensor is received.

The second insulation may also have been inserted into the cover such that the second insulation together with the first insulation thermally encapsulates the sensor portion when the cover is placed on the base part.

The mass flow sensor can then be permanently connected, for example by coupling, in particular by welding the capillary tube to at least one of the sleeves.

For this purpose, the capillary tube is first pushed back into the sleeve by means of a plunger until the capillary tube slightly protrudes from the sleeve, for example at a defined distance.

The ends of the capillary tube can then be formed by means of the plunger, in particular by flanging.

The sleeve can then be pressed together with the capillary tube using the plunger.

The capillary tube can then be welded to the sleeve. A laser can be provided to perform a (pendulum) rotary motion to effectively weld the formed end of the capillary tube to the sleeve.

The receiving space, in which the mass flow sensor is received, is then filled with a casting compound, for example a casting resin, so that the mass flow sensor is embedded in the casting compound and thus received in a protected manner in the sensor housing.

Finally, a circuit board can be coupled to the sensor housing, which simultaneously can be brought into electrical contact with the corner supports. For this purpose, the circuit board has corresponding electrical contacts. Each electrical contacts can be permanently connected, for example soldered to the corner supports. This ensures a mechanical and electrical connection between the circuit board and the respective corner supports, i.e. the mass flow sensor.

Alternatively, the receiving space can be filled with the casting compound only after the mechanical and electrical connection has been established.

BRIEF DESCRIPTION OF THE DRAWINGS

Further advantages and properties of the claimed subject matter will become apparent from the description below and from the drawings to which reference is made and in which:

DETAILED DESCRIPTION

Figure 1:
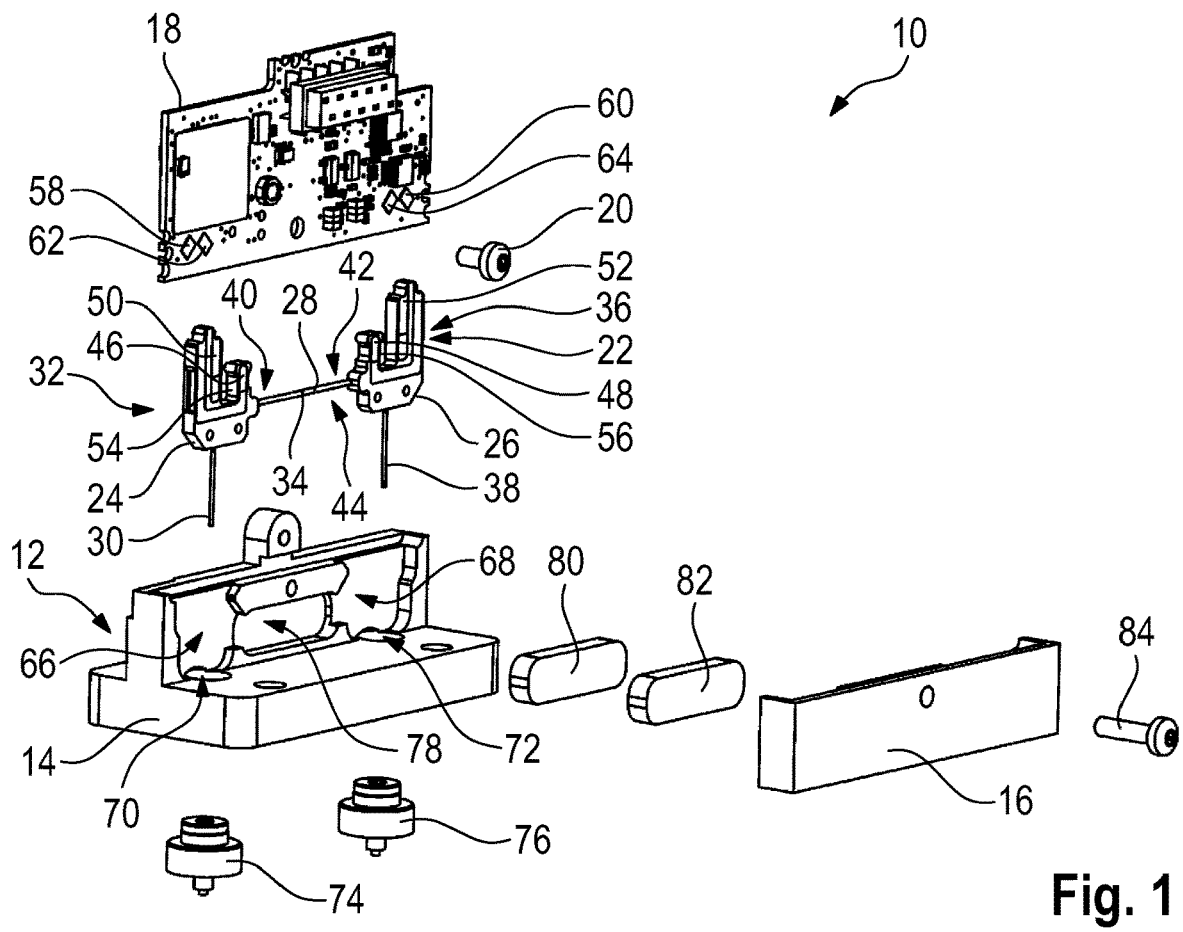
FIG. 1 shows an exploded view of a mass flow sensor assembly according to the present disclosure.

FIG. 1 shows an exploded view of a mass flow sensor assembly 10 which can be used in a mass flow controller (MFC) or mass flow meter (MFM).

In the embodiment shown, the mass flow sensor assembly 10 comprises a sensor housing 12 which in the present case is configured in two pieces and comprises a base part 14 and a cover 16, which may also be referred to as the housing lid.

Figure 2:
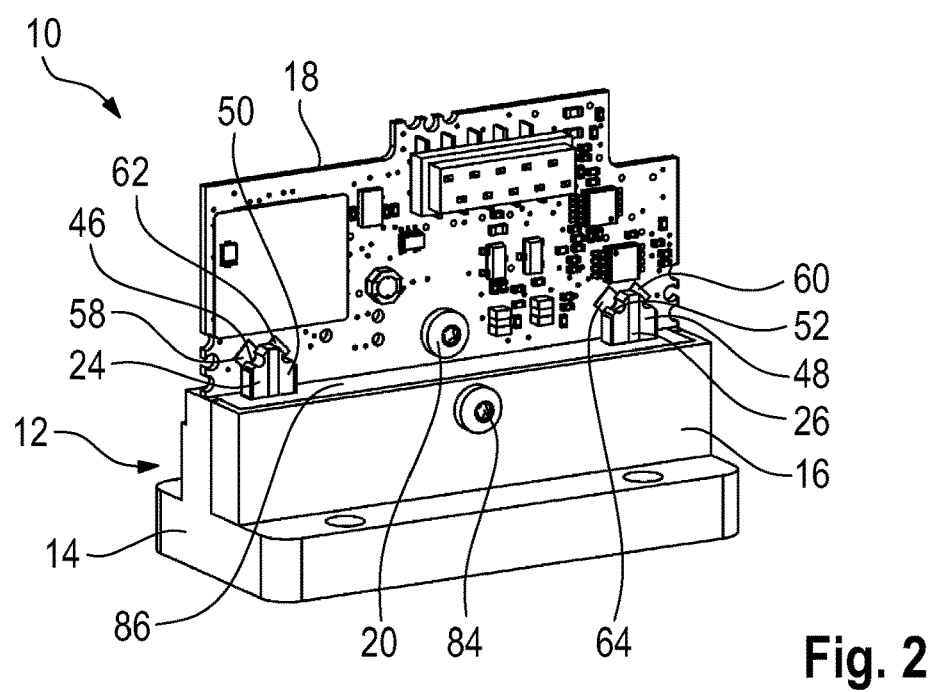
FIG. 2 shows a perspective view of the mass flow sensor assembly according to the present disclosure of FIG. 1.

In addition, the mass flow sensor assembly 10 comprises a circuit board 18 which is coupled to the sensor housing 12 in the assembled state, as shown in FIG. 2 which shows the mass flow sensor assembly 10 in the assembled state.

The circuit board 18 can be at least partially inserted into the sensor housing 12 or placed onto the sensor housing 12 and can be fastened to the sensor housing 12 in a mechanically detachable by a fastening means 20 such as a screw, as clearly shown in FIG. 2.

In addition, the mass flow sensor assembly 10 comprises a mass flow sensor 22 which, in the assembled state, is at least partially, and in particular largely, received within the sensor housing 12, as clearly shown in FIG. 2.

The mass flow sensor 22 comprises two corner supports 24, 26 and a capillary tube 28, which is supported or held by the two corner supports 24, 26.

Figure 3:
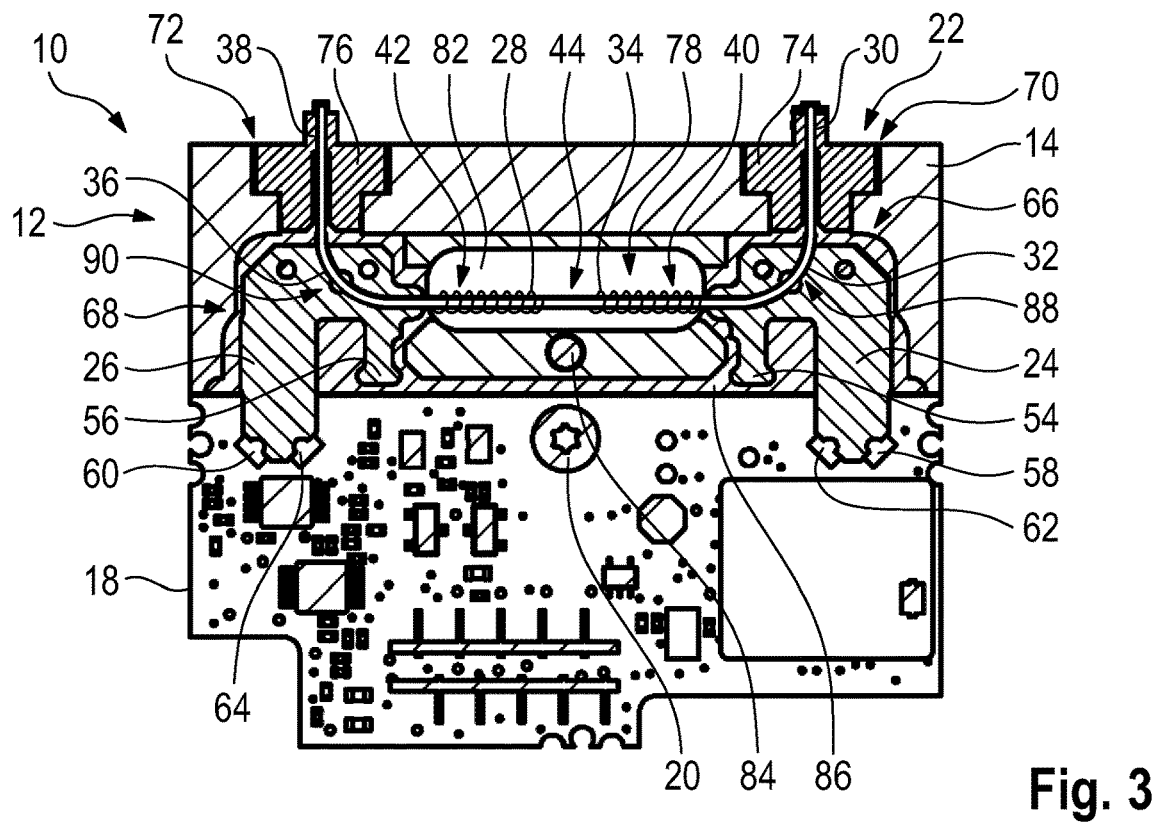
FIG. 3 shows a sectional view of the mass flow sensor assembly of FIGS. 1 and 2.

The capillary tube 28 comprises a first leg 30, an adjoining arcuate portion 32, an adjoining sensor portion 34, an adjoining arcuate portion 36 and a second leg 38, which branches off from the second arcuate portion 36, as is particularly clear from FIG. 3, which shows a representation rotated by 180°.

The two arcuate portions 32, 36 substantially correspond to a 90° bend, so that the capillary tube 28 generally has a U-shape, the two free ends of the capillary tube 28 being assigned to the legs 30, 38.

Furthermore, the mass flow sensor 22 comprises a first sensor coil 40 and a second sensor coil 42, both of which are wound around the sensor portion 34 of the capillary tube 28. The two sensor coils 40, 42 are electrically insulated from each other. In addition, a gap 44 is provided between the two sensor coils 40, 42. In other words, the individual windings of the sensor coils 40, 42 do not overlap in the area of the gap 44.

The sensor coils 40, 42 are each assigned to one of the two corner supports 24, 26.

The two sensor coils 40, 42 are each made of a wire wound around the capillary tube 28 in the area of the sensor portion 34. The respective wire therefore has two open ends which must be electrically contacted.

In particular, each of the two sensor coils 40, 42 has its two ends in electrical contact with the corner support 24, 26.

For this purpose, the respective corner support 24, 26 has a first contact element 46, 48 and a second contact element 50, 52, respectively, at which the two ends of the sensor coils 40, 42 are connected both mechanically and electrically, for example via a soldered joint.

In the embodiment shown, the first contact elements 46, 48 of the two corner supports 24, 26 are each assigned to fastening projections 54, 56 of the corner supports 24, 26.

Specifically, the sensor coils 40, 42 are each wound with at least one winding around the corresponding fastening projection 54, 56 of the respective corner support 24, 26, so that a mechanical fixing of the sensor coils 40, 42 with respect to the capillary tube 28 is possible.

The first contact elements 46, 48 extend from the fastening projections 54, 56 to a distal end of the respective corner support 24, 26, towards which the second contact element 50, 52 also extends.

This distal end of the respective corner support 24, 26 protrudes from the sensor housing 12, so that it can be contacted by the circuit board 18 when the mass flow sensor 22 is received in the sensor housing 12, as clearly shown in FIG. 2.

To this end, the circuit board 18 has first electrical contacts 58, 60 and second electrical contacts 62, 64 which cooperate with the corresponding first contact element 46, 48 and the second contact element 50, 52, respectively, of the corner supports 24, 26 to ensure the electrical contacting of the mass flow sensor 22 with the circuit board 18.

The electrical connection may also be established by means of a soldered joint, which at the same time enables a mechanical fixing.

It is also clear from FIG. 1 that the mass flow sensor 22 can be received in the sensor housing 12, in particular in the base part 14, as recesses 66, 68 are provided for this purpose, in which the two corner supports 24, 26 of the mass flow sensor 22 can be received.

The recesses 66, 68 are assigned to openings 70, 72 of the sensor housing 12, in particular of the base part 14, into which sleeves 74, 76 are inserted, as explained below with reference to FIGS. 4 to 13.

A cavity 78 is provided between the two recesses 66, 68 and is assigned to the sensor portion 34 of the capillary tube 28 when the mass flow sensor 22 has been inserted into the sensor housing 12.

In addition, two insulations 80, 82 are provided in the cavity 78 in the assembled state, which thermally insulate the mass flow sensor 22, in particular thermally encapsulate the sensor portion 34 of the capillary tube 28.

After insertion of the mass flow sensor 22 into the sensor housing 12, the cover 16 is connected to the base part 14 via a fastening means 84, such that the mass flow sensor 22 is received in the sensor housing 12 so as to be protected from external influences.

The space created between the cover 16 and the base part 12 and in which the mass flow sensor 22 is received, is completely filled with a casting compound 86, for example,
so that the mass flow sensor 22 is received in the sensor housing 12 in a protected manner. The fillable space includes, for example, the recesses 66, 68 and excludes the cavity 78, in which the mass flow sensor 22 is located, with the insulations 80, 82.

FIG. 3 which shows a sectional view of FIG. 2, also shows that the free ends of the U-shaped capillary tube 28, i.e. the ends of the capillary tube 28 assigned to the legs 30, 38 are assigned to the two sleeves 74, 76, which have been inserted into the openings 70, 72.

Furthermore, it can be seen from FIG. 3 that the two corner supports 24, 26 each have an arc-shaped groove 88, 90, in which the capillary tube 28 is received via its two arcuate portions 32, 36.

The arc-shaped grooves 88, 90 therefore also have a bend of about 90° in order to guide the capillary tube 28 accordingly.

The two corner supports 24, 26, in particular the arc-shaped grooves 88, 90 of the corner supports 24, 26, are therefore each assigned exclusively to one of the two arcuate portions 32, 36 of the capillary tube 28.

In other words, the two corner supports 24, 26 are each assigned to different portions of the capillary tube 28, namely to the two arcuate portions 32, 36 of the capillary tube 28. These are the portions of the capillary tube 28 which adjoin the respective ends of the sensor portion 34.

Therefore, the two corner supports 24, 26 do not abut each other. The two corner supports 24, 26 do not contact each other, either. Rather, the two corner supports 24, 26 are spaced apart from each other.

In addition, FIG. 3 clearly shows that the two corner supports 24, 26 and the capillary tube 28 are in a common plane, in particular in a common sectional plane of the mass flow sensor assembly 10.

Furthermore, FIG. 3 shows that the two contact elements 46-52 of the corner supports 24, 26 extend to a distal end which is opposite to the free ends of the capillary tube 28.

It will be explained below with reference to FIGS. 4 to 13 how the mass flow sensor assembly 10 shown in FIGS. 1 to 3 is manufactured.

Figure 4:
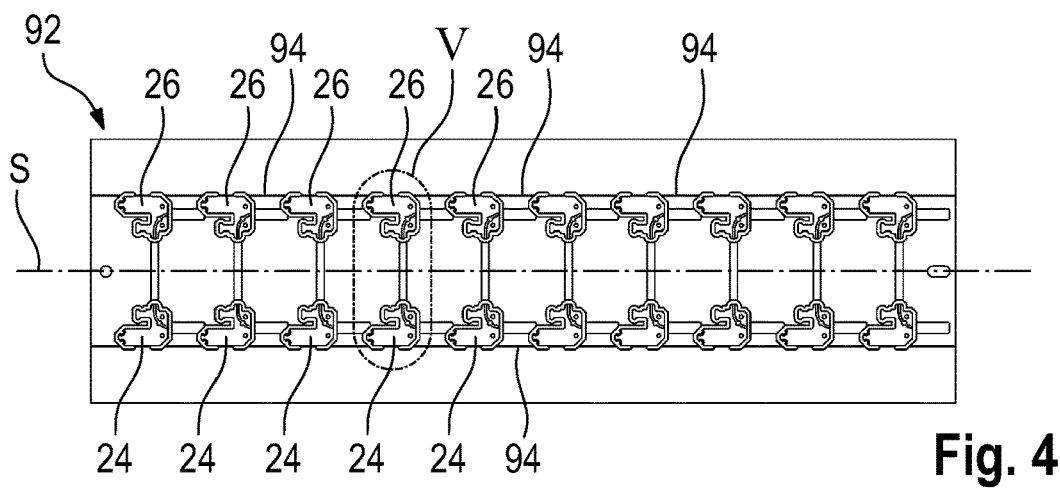
FIG. 4 shows a top view of a panel for the manufacture of the corner supports of the mass flow sensor assembly according to the present disclosure.

In a first step, a panel 92 shown in FIG. 4 is provided, which comprises a plurality of corner supports 24, 26, which are each substantially arranged in pairs, mirrored to each other about an axis of symmetry S.

A total of ten pairs of corner supports 24, 26 are shown in the embodiment shown in FIG. 4, each pair comprising a first corner support 24 and a second corner support 26, each pair being adapted to be used by one mass flow sensor assembly 10.

Figure 5:
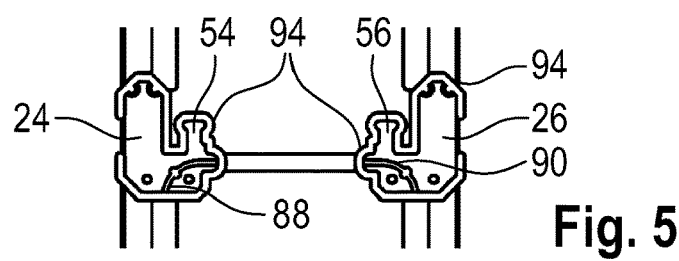
FIG. 5 shows a detailed view of FIG. 4 showing two corner supports.

The two corner supports 24, 26 are oriented to each other in the panel 92 such that the arc-shaped grooves 88, 90 thereof have their corresponding ends facing each other; see in particular FIG. 5. This orientation already corresponds to the orientation in the finished state of the mass flow sensor assembly 10, in particular of the mass flow sensor 22.

In other words, the two corner supports 24, 26 are provided already correctly oriented to each other on the panel 92, as a result of which the degree of automation can be increased and thus the manufacturing costs can be reduced.

Basically, the panel 92 has a number of corner supports 24, 26, which are arranged next to each other or one below the other. The respective corner supports 24, 26 can be produced by milling or etching.

Furthermore, the panel 92 includes separating edges 94, which ensure that the individual corner supports 24, 26 can be easily separated from the panel 92. This can be carried out by manual breaking, by milling them free or by punching.

Apart from the separating edges 94, the respective corner supports 24, 26 do not have any connection to the panel 92.

Figure 6:
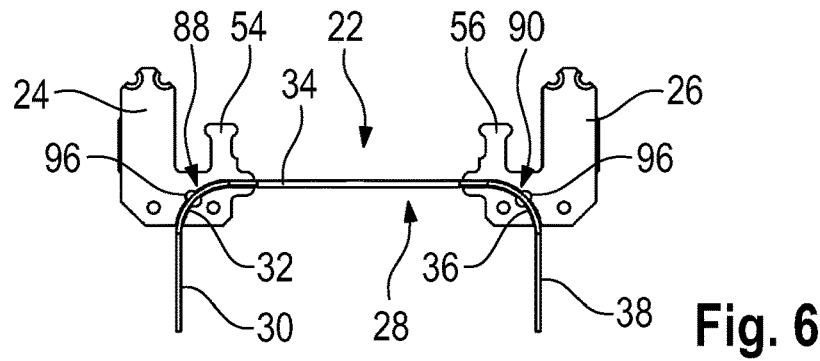
FIG. 6 shows the corner supports of FIG. 5 in a subsequent manufacturing step.

Subsequently, a capillary tube 28 already configured in a U-shape is inserted into one pair of the corner supports 24, 26, i.e. into two corner supports 24, 26 arranged in a mirror-inverted manner, wherein the arcuate portions 32, 36 of the capillary tube 28 are fitted into the arc-shaped grooves 88, 90 of the corner supports 24, 26, as shown in FIG. 6.

Subsequently, the capillary tube 28 can be permanently connected to the two corner supports 24, 26, for example by means of an adhesive joint 96, which has also been provided in the corresponding corner support 24, 26, in particular in the form of a depression. The adhesive joint 96 can be produced by milling or etching.

In this respect, the capillary tube 28 can be permanently mechanically connected to the corresponding corner support 24, 26 at the adhesive joint 96 via an adhesive spot.

In FIG. 6, the adhesive point is only shown for the first corner support 24, so that the depression in the second corner support 26 is still visible.

After the coupling of the capillary tube 28 to the two corner supports 24, 26, the two corner supports 24, 26 can be separated from the panel 92 via the separating edges 94, which is already shown in FIG. 6.

Two corner supports 24, 26 which are formed separately from each other and are only connected to each other via the capillary tube 28 are thus produced.

Figure 7:
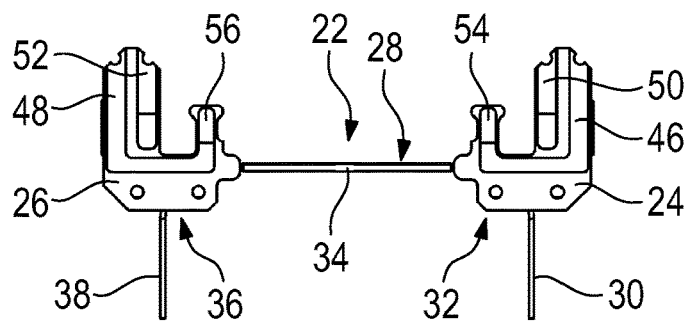
FIG. 7 shows the representation of FIG. 6 rotated by 180°.

FIG. 7 shows the corresponding intermediate state of the mass flow sensor 22 rotated by 180° with respect to FIG. 6, so that the respective contact elements 46-52 can be seen.

In other words, the contact elements 46-52 are located on the sides of the corner supports 24, 26 opposite to the arc-shaped grooves 88, 90. In an alternative embodiment, the contact elements 46-52 can also be located on the same side of the respective arc-shaped groove 88, 90 or in the corner supports 24, 26.

FIG. 7 clearly shows that the respective first contact element 46, 48 extends from the respective fastening projection 54, 56 to the distal end of the corner support 24, 26, in particular in a U-shape, which protrudes from the sensor housing 12.

Figure 8:
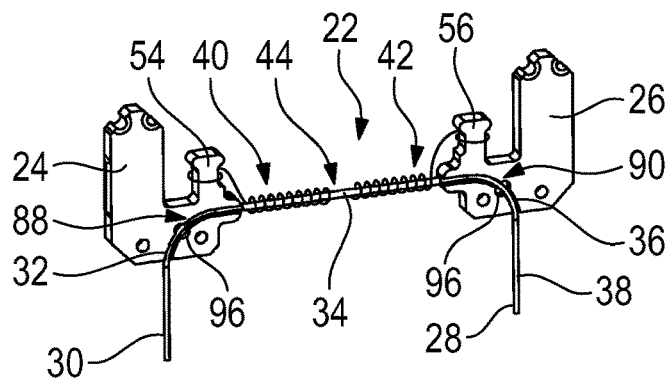
FIG. 8 shows the detail of FIGS. 6 and 7 in a perspective view in a later manufacturing step.

After the two corner supports 24, 26 with the inserted capillary tube 28 have been separated from the panel 92, a first wire and a second wire are wound around the capillary tube 28 in the area of the sensor portion 34 to form the first sensor coil 40 and the second sensor coil 42, which is shown schematically in FIG. 8.

To this end, the corresponding wire is (temporarily) connected to the assigned corner support 24, 26 via a free end of the wire.

The rest of the wire is then wound around the capillary tube 28, in particular the sensor portion 34, until the corresponding sensor coil 40, 42 has been wound in the desired manner.

The other free end of the wire is then connected to one of the two contact elements 46-52 of the corresponding corner support 24, 26, via a soldered connection, for example. In particular, the still free end of the wire is connected to the corresponding second contact element 50, 52 of the corresponding corner support 24, 26.

Subsequently, the first wire end, which was previously only temporarily coupled to the corner support 24, 26, can also be permanently connected thereto, for example also via a soldered connection.

However, it may also be provided that the first wire end has already been permanently connected to the corner support 24, 26, in particular to the corresponding contact element 46-52, preferably to the first contact element 46, 48.

The two wires forming the two sensor coils 40, 42 can be wound around the capillary tube 28 in the area of the sensor portion 34 either simultaneously or one after the other.

Finally, the two sensor coils 40, 42 are formed in an identical way, wherein the two sensor coils 40, 42 are insulated from each other, as the windings of their wires do not overlap. In other words, the gap 44 between the two sensor coils 40, 42 is created upon winding of the sensor coils 40, 42.

After the two sensor coils 40, 42 have been wound, the assigned wire can be coupled to the capillary tube 28 by an inter-material bond and/or with a frictional fit in order to avoid a subsequent slipping of the respective sensor coil 40, 42.

This can be ensured in a simple manner by means of an adhesive connection.

Figure 9:
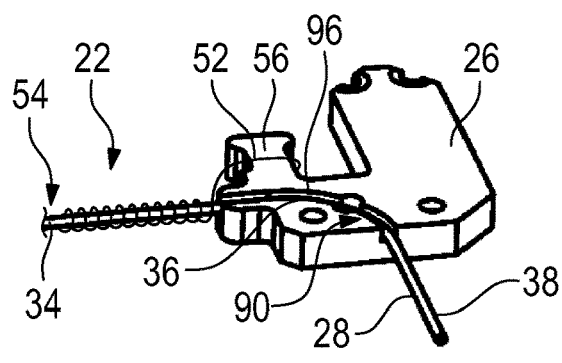
FIG. 9 shows a detail of FIG. 8.

FIGS. 8 and 9 also show that the respective sensor coil 40, 42 has been wound with at least one winding around the assigned fastening projection 54, 56 of the respective corner support 24, 26. This can also be used to obtain a mechanical fixing of the corresponding sensor coil 40, 42.

As already explained, the corresponding fastening projection 54, 56 can be part of the first contact element 46, 48 of the corresponding corner support 24, 26, as also shown in FIG. 7, so that via the fastening projection 54, 56, an electrical contacting of the respective sensor coil 40, 42 can be made in addition to the mechanical fastening.

Figure 10:
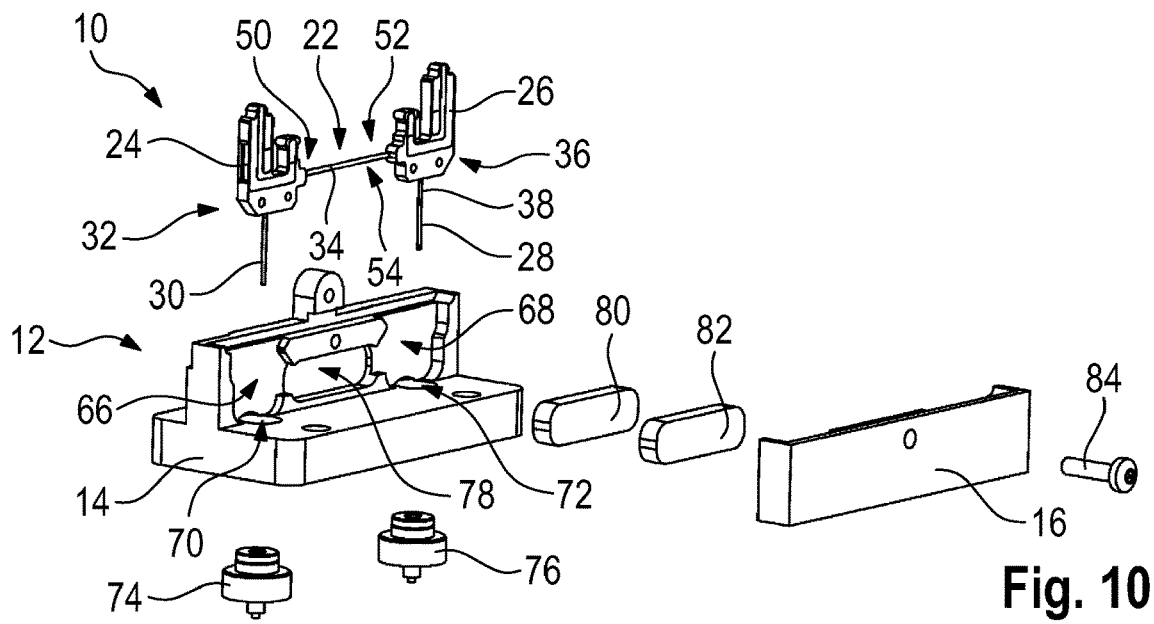
FIG. 10 shows a perspective view of the mass flow sensor assembly to be manufactured at a later point in time of manufacture.

The mass flow sensor 22 is now manufactured and can be inserted into the sensor housing 12, as shown in FIG. 10.

For this purpose, the two sleeves 74, 76 are first inserted, in particular pressed into the openings 70, 72, into bores, for example.

The base part 14 of the sensor housing 12 can be made of aluminum, which improves the thermal conductivity. Alternatively, the base part 14 can be made of copper or another thermally conductive material.

The first insulation 80 is then inserted into the cavity 78.

The mass flow sensor 22 is then inserted into the sensor housing 12, in particular into the base part 14, by inserting the two corner supports 24, 26 into the assigned recesses 66, 68. The capillary tube 28 is then inserted via its ends into the sleeves 74, 76. The sensor portion 34 of the capillary tube 28 runs through the cavity 78, which has already been covered on one side by the first insulation 80.

Then the second insulation 82 is inserted to embed or thermally encapsulate the capillary tube 28, in particular the sensor portion 34, in a thermally insulating manner. This effectively shields the mass flow sensor 22 against environmental influences.

Then the cover 16 is placed thereon and connected to the base part 14 via the fastening means 84.

Alternatively, the second insulation 82 can also be inserted into the cover 16 first, so that the second insulation 82 surrounds the capillary tube 28, in particular the sensor portion 34, when the cover 16 is put thereon.

After the mass flow sensor 22 has been inserted into the sensor housing 12, the capillary tube 28 is still coupled to the sleeves 74, 76 in an extraction-proof manner.

Figures 11, 12:
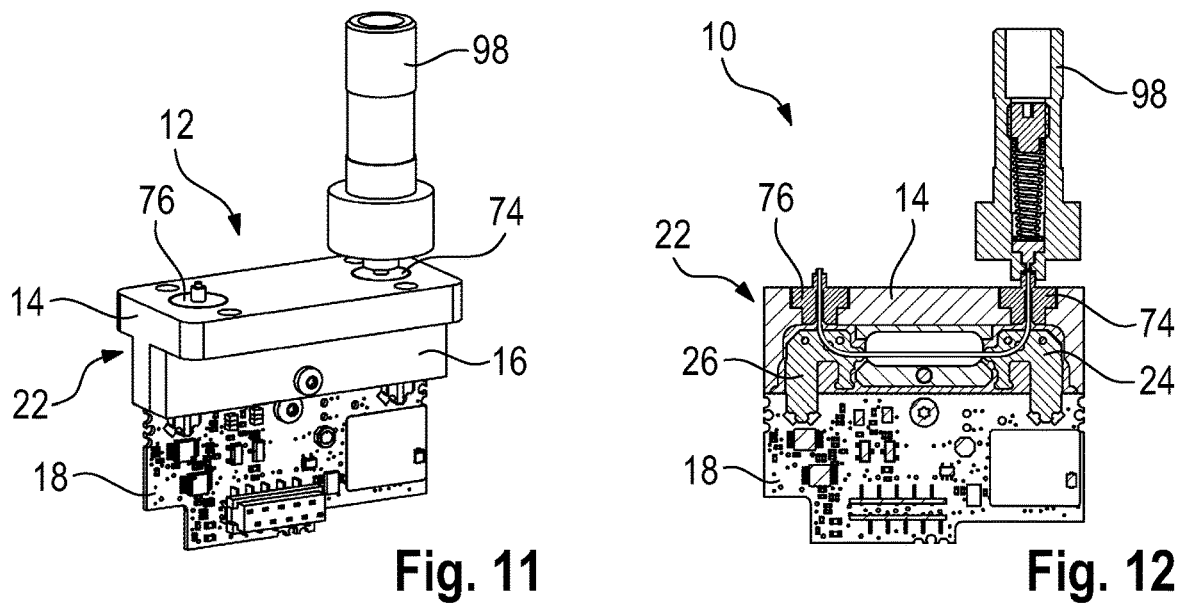
FIG. 11 shows a perspective view of the manufactured mass flow sensor assembly according to FIG. 2 at a later point in time.
FIG. 12 shows a sectional view of the manufactured mass flow sensor assembly according to FIG. 11.
Figure 13:
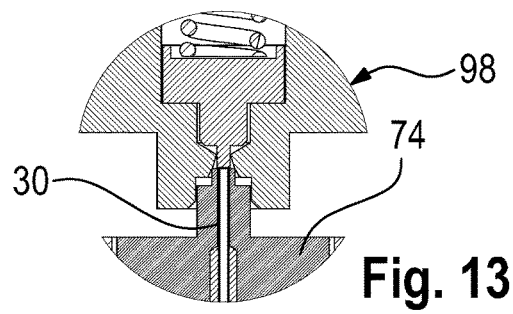
FIG. 13 shows a detailed view of FIG. 12.

To this end, a plunger 98 is used, which pushes the capillary tube 28 back into the corresponding sleeve 74, 76 until the capillary tube 28 only slightly protrudes at the sleeve 74, 76. This is shown in FIGS. 11 to 13.

Here the plunger 98 is used after the coupling of the circuit board 18 to the sensor housing 12. However, this can also be carried out before, as will be explained below.

The ends of the capillary tube 28 are formed by means of the plunger 98, in particular flanged.

Then the respective sleeve 74, 76 is pressed with the corresponding end of the capillary tube 28, wherein the capillary tube 28 is then welded to the respective sleeve 74, 76 via its ends. For this purpose, a laser can be used which carries out a (pendulum) rotary motion.

After the permanent coupling of the capillary tube 28 to the sleeves 74, 76, the mass flow sensor 22, which is received in the housing 12, can be encapsulated with the casting compound 86, so that the mass flow sensor 22 is received in the sensor housing 12 so as to be protected against external influences.

Then the circuit board 18 is first fastened to the sensor housing 12, in particular by means of the fastening means 20.

The distal ends of the respective corner supports 24, 26, which protrude from the sensor housing 12, can then be mechanically and electrically coupled to the electrical contacts 58-64 of the circuit board 18, for example via a soldered connection.

The mass flow sensor assembly 10 is thus manufactured.

The invention claimed is:

1. A mass flow sensor assembly for a mass flow controller or a mass flow meter, comprising a mass flow sensor which comprises a capillary tube which is held by a first corner support and a second corner support formed separately from each other, wherein the capillary tube comprises a sensor portion located between the two corner supports, and the two corner supports each have an arc-shaped groove in which the capillary tube is partially received, wherein the two corner supports are spaced apart from each other so that a free space is provided between the two corner supports in which the sensor portion is located, wherein the capillary tube has at least two arcuate portions which are arranged in the arc-shaped grooves of the two corner supports, wherein the sensor portion is provided between the two arcuate portions, and wherein each of the arcuate portions of the capillary tube is in contact with the arc-shaped groove of a respective one of the two corner supports and permanently connected to the respective one of the two corner supports at an adhesive joint via an adhesive spot in the arc shaped groove.

2. The mass flow sensor assembly according to claim 1, wherein the two arcuate portions each are joined by straight legs.

3. The mass flow sensor assembly according to claim 1, wherein the mass flow sensor has a first sensor coil and a second sensor coil which are electrically insulated from each other and which are wound at least partially around the sensor portion, wherein the first sensor coil is assigned to the first corner support and the second sensor coil is assigned to the second corner support.

4. The mass flow sensor assembly according to claim 3, wherein the respective sensor coil has a first end and a second end connected to a first contact element and to a second contact element of the assigned corner support.

5. The mass flow sensor assembly according to claim 3, wherein the respective sensor coil has at least one winding which is wound around a fastening projection of the assigned corner support.

6. The mass flow sensor assembly according to claim 5, wherein the fastening projection is oriented substantially perpendicular to the sensor portion.

7. The mass flow sensor assembly according to claim 4, wherein the respective sensor coil has at least one winding which is wound around a fastening projection of the assigned corner support, wherein the fastening projection is part of the first contact element.

8. The mass flow sensor assembly according to claim 1, wherein the mass flow sensor assembly has a sensor housing in which the mass flow sensor is at least partially received.

9. The mass flow sensor assembly according to claim 8, wherein the sensor housing is configured in several parts.

10. The mass flow sensor assembly according to claim 8, wherein the sensor housing comprises two recesses in which the two corner supports are received, and a cavity which is located between the two recesses, wherein the sensor portion of the capillary tube extends through the cavity.

11. The mass flow sensor assembly according to claim 10, wherein at least one insulation is arranged in the cavity.

12. A method of manufacturing a mass flow sensor assembly, comprising the following steps:

providing a first corner support and a second corner support, wherein the corner supports each have an arc-shaped groove and are spaced apart from each other so that a free space is provided between the two corner supports in which a sensor portion is located, and inserting a capillary tube into the corner supports by fitting arcuate portions of the capillary tube into the arc-shaped grooves such that the sensor portion of the capillary tube is formed between the two spaced apart corner supports and such that each of the arcuate portions of the capillary tube is in contact with the arc-shaped groove of a respective one of the two corner supports and permanently connected to the respective one of the two corner supports at an adhesive joint via an adhesive spot in the arc shaped groove.

13. The method according to claim 12, wherein the two corner supports are manufactured in a common panel.

14. The method according to claim 12, wherein a first sensor coil and a second sensor coil which are assigned to the first corner support and the second corner support, respectively, are wound around the sensor portion.

* * * * *